US010425279B2

(12) United States Patent
Wang et al.

(10) Patent No.: US 10,425,279 B2
(45) Date of Patent: Sep. 24, 2019

(54) DISTRIBUTED NETWORK EMULATION IMPLEMENTED BY A NETWORK MANAGEMENT ENTITY IN A VIRTUALIZED COMPUTING ENVIRONMENT

(71) Applicant: Nicira, Inc., Palo Alto, CA (US)

(72) Inventors: Ziyou Wang, Beijing (CN); Hua Wang, Beijing (CN); Jianjun Shen, Palo Alto, CA (US); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 321 days.

(21) Appl. No.: 15/456,596

(22) Filed: Mar. 13, 2017

(65) Prior Publication Data
US 2018/0262396 A1 Sep. 13, 2018

(51) Int. Cl.
*H04L 12/24* (2006.01)
*H04L 29/08* (2006.01)
*H04L 12/741* (2013.01)
*H04L 12/26* (2006.01)
*H04L 12/931* (2013.01)

(52) U.S. Cl.
CPC .......... *H04L 41/0816* (2013.01); *H04L 41/14* (2013.01); *H04L 45/74* (2013.01); *H04L 67/146* (2013.01); *H04L 67/2861* (2013.01); *H04L 43/08* (2013.01); *H04L 49/70* (2013.01)

(58) Field of Classification Search
CPC ................................................ H04N 21/4437
See application file for complete search history.

(56) References Cited

U.S. PATENT DOCUMENTS 6,493,755 B1 12/2002 Hansen et al.
8,600,726 B1 * 12/2013 Varshney ................ H04L 69/18
703/26

(Continued)

OTHER PUBLICATIONS

"Netem", Project Collaboration Site, Linux Foundation Wiki, Retrieved from the Internet at <URL: https://wiki.linuxfoundation.org/networking/netem> on Mar. 10, 2017, Last modified on Jul. 19, 2016.

(Continued)

*Primary Examiner* — Jamaal Henson
(74) *Attorney, Agent, or Firm* — Su IP Consulting

(57) ABSTRACT

Example methods are provided for a network management entity to implement distributed network emulation in a virtualized computing environment. The method may comprise: generating a translated network emulation rule by translating a source identifier and a destination identifier in a network emulation rule to respective source network address and destination network address, and configuring a source host or destination host to apply the translated network emulation rule to emulate a desired network condition for one or more first packets from the source network address to the destination network address. The method may further comprise: in response to detecting that the source network address or destination network address has been updated, updating the source network address or destination network address in the translated network emulation rule; and reconfiguring the source host or destination host to apply the updated translated network emulation rule.

21 Claims, 8 Drawing Sheets

(56) References Cited

U.S. PATENT DOCUMENTS

| | | | |
|---|---|---|---|
| 2006/0039538 A1* | 2/2006 | Minnis | H04B 17/3912 379/1.01 |
| 2013/0006601 A1* | 1/2013 | Mlinarsky | H04B 17/0087 703/23 |
| 2014/0337674 A1* | 11/2014 | Ivancic | H04L 43/50 714/43 |
| 2016/0026789 A1* | 1/2016 | Martini | G06F 9/455 718/1 |
| 2017/0060628 A1 | 3/2017 | Tarasuk-Levin et al. | |
| 2017/0214598 A1* | 7/2017 | Kano | H04L 41/145 |
| 2018/0260236 A1 | 9/2018 | Wang et al. | |

OTHER PUBLICATIONS

"SoftPerfect Connection Emulator—Controlled Environment for Network Application Testing", SoftPerfect—Network Management Solutions, Retrieved from the Internet at <URL: https://www.softperfect.com/products/connectionemulator/> on Mar. 10, 2017.

Manoj Nambiar et al., "WANem—The Wide Area Network Emulator", TATA Consultancy Services—Performance Engineering Research Centre, Retrieved from the Internet at <URL: http://wanem.sourceforge.net/> on Mar. 10, 2017, Mumbai India.

Retrieved from the Internet at <URL: http://packetstorm.com/> on Mar. 13, 2017.

"Network Emulators from iTrinegy", iTrinegy, Retrieved from the Internet at <URL: https://en.wikipedia.org/wiki/Network_tomography> on Mar. 10, 2017.

"Network Tomography", Wikipedia, Retrieved from the Internet at < URL: http://en.wikipedia.org/wiki/Parallel_ATA> on Mar. 10, 2017, last modified on Apr. 22, 2013, Last modified on Apr. 22, 2015.

Rui Castro et al., "Network Tomography: Recent Developments", Statistical Science, 2004, pp. 499-517, vol. 19, No. 3.

Y. Vardi, "Network Tomography: Estimating Source-Destination Traffic Intensities from Link Data", Journal of the American Statistical Association, Mar. 1996, pp. 365-377, vol. 91, Issue 433.

Yolanda Tsang et al., "Network Delay Tomography", IEEE Transactions on Signal Processing, Aug. 2003, pp. 2125-2136, vol. 51, No. 8.

N.G. Duffield et al., "Inferring Link Loss Using Striped Unicast Probes", IEEE Infocom 2, 2001, pp. 915-923.

* cited by examiner

DISTRIBUTED NETWORK EMULATION IMPLEMENTED BY A NETWORK MANAGEMENT ENTITY IN A VIRTUALIZED COMPUTING ENVIRONMENT

CROSS-REFERENCE TO RELATED APPLICATIONS

The present application Ser. No. 15/456,596 is related in subject matter to U.S. patent application Ser. No. 15/456,594, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC), etc. For example, through server virtualization, virtual machines running different operating systems may be supported by the same physical host. Each virtual machine is generally provisioned with virtual resources to run an operating system and applications. The virtual resources may include central processing unit (CPU) resources, memory resources, storage resources, network resources, etc.

In practice, network emulation is useful for application development and testing to mimic the behavior of a production network. A well-developed and tested application should consider the requirements of users connecting from networks having different characteristics, such as a mobile phone network, satellite network, etc. However, conventional network emulators are not necessarily suitable for use in a virtualized computing environment.

DETAILED DESCRIPTION

Figure 1:
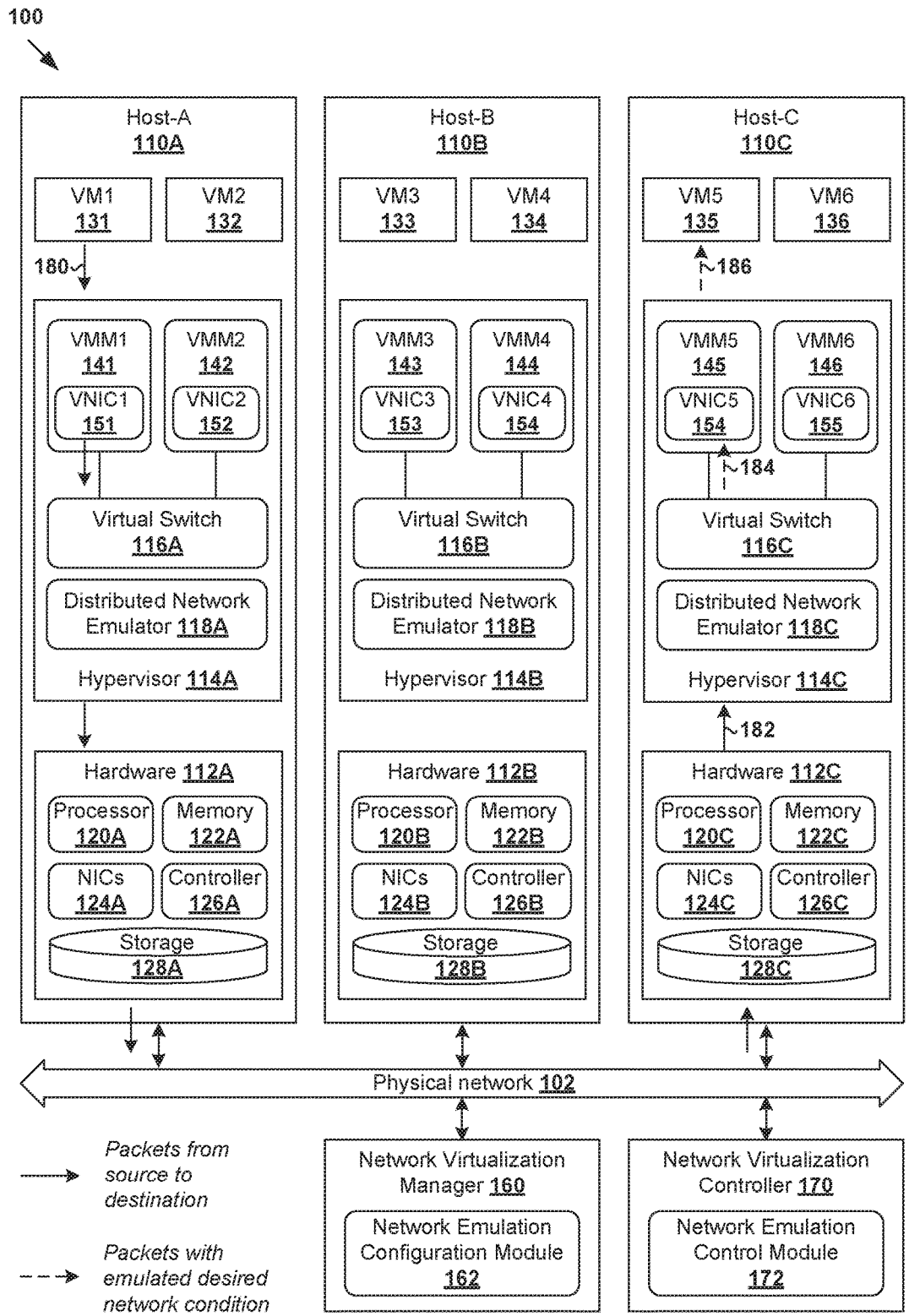
FIG. 1 is a schematic diagram illustrating an example virtualized computing environment in which distributed network emulation may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to network emulation implementation will now be explained in more detail using FIG. 1, which is a schematic diagram illustrating example virtualized computing environment 100 in which distributed network emulation may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are connected via physical network 102. Each host 110A/110B/110C includes suitable hardware 112A/112B/112C and virtualization software (e.g., hypervisor 114A/114B/114C) to support virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-136, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. As used herein, the term "hypervisor" may refer generally to a software layer or component that supports the execution of multiple virtualized computing instances, including system-level software that supports namespace containers such as Docker, etc.

Hypervisor 114A/114B/114C maintains a mapping between underlying hardware 112A/112B/112C and virtual resources allocated to respective virtual machines 131-135. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. To support guest operating systems and applications, virtual resources are allocated to the virtual machines. For example, corresponding to hardware 112A/112B/112C, the virtual resources may include virtual CPU, virtual memory, virtual disk, virtual network interface controller (VNIC), etc.

Hardware resources may be emulated using virtual machine monitors (VMMs). For example in FIG. 1, VNIC1 151, VNIC2 152, VNIC3 153, VNIC4 154, VNIC5 155 and VNIC6 156 are emulated by respective VMM1 141, VMM2 142, VMM3 143, VMM4 144, VMM5 145 and VMM6 146. In practice, VMMs 141-146 may be considered as a component of respective VMs 131-136. Hypervisor 114A/114B/114C implements virtual switch 116A/116B/116C to handle both egress packets (i.e., outgoing or outbound) from, and ingress packets (i.e., incoming or inbound) to, the virtual machines. Each virtual switch 116A/116B/116C generally represents a logical collection of virtual ports that are each logically associated with a VNIC.

As used herein, the term "packet" may refer generally to a group of bits that can be transported together from a source to a destination, such as segment, frame, message, datagram, etc. Also, the term "layer 2" may refer generally to a Media Access Control (MAC) layer; and "layer 3" to a network or Internet Protocol (IP) layer in the Open System Interconnection (OSI) model, although the concepts described herein may be used with other networking models. Physical network 102 may include any suitable number of interconnected network devices, such as layer-3 routers, layer-2 switches, gateway devices, etc.

In practice, network emulation may be performed during application testing to emulate various network characteristics between a pair of virtual machines. For example in FIG. 1, an application running on VM1 131 on host-A 110A and/or VM5 135 on host-C 110C may be tested by configuring network emulation for packets travelling between them. However, conventional approaches for network emulation are not necessarily suitable for use in virtualized computing environment 100.

One conventional approach is to use emulation software developed for a specific operating system (OS) platform. Since virtual machines 131-136 in virtualized computing environment 100 may run different types of guest OS, a network administrator will have to use different tools to configure network emulation on different OS platforms. Another conventional approach is to install emulation software on a general-purpose computer that acts as a dedicated network proxy between a pair of client and server. This removes the limitation on the type of OS running on the client and server, but necessitates all traffic to go through the network proxy. Since the general-purpose computer has limited processing capability, this approach lacks scalability because the network proxy is likely to become a bottleneck and suffer from performance degradation.

Further, network emulation results produced by the above conventional approaches may be inaccurate when implemented in virtualized computing environment 100. This is because they are designed for applications running on a local area network (LAN). For example, regardless of whether the underlying physical network is experiencing congestion, the emulation software will simply add more delay to the packets. This is usually acceptable in a LAN setup, but is not appropriate for virtualized computing environment 100 where the physical network is shared by multiple tenants and has varying network characteristics. The issue may be addressed using a dedicated hardware emulation device that connects directly with the client and server (instead of over a network). However, such conventional hardware emulation devices are usually expensive to implement, and it is challenging to set up the direct connection with virtual machines in a cloud environment.

Distributed Network Emulation

According to examples of the present disclosure, network emulation may be implemented in a distributed manner by a host, such as source host-A 110A supporting source VM1 131 or destination host-C 110C supporting destination VM5 135 in the example in FIG. 1. Depending on a physical network condition associated with a path between source VM1 131 and destination VM5 135, an emulation action may be performed to emulate the desired network condition. Unlike the above conventional approaches, examples of the present disclosure provide a self-adaptive way to adjust emulation actions over time according to the physical network condition to produce more accurate emulation results.

Figure 2:
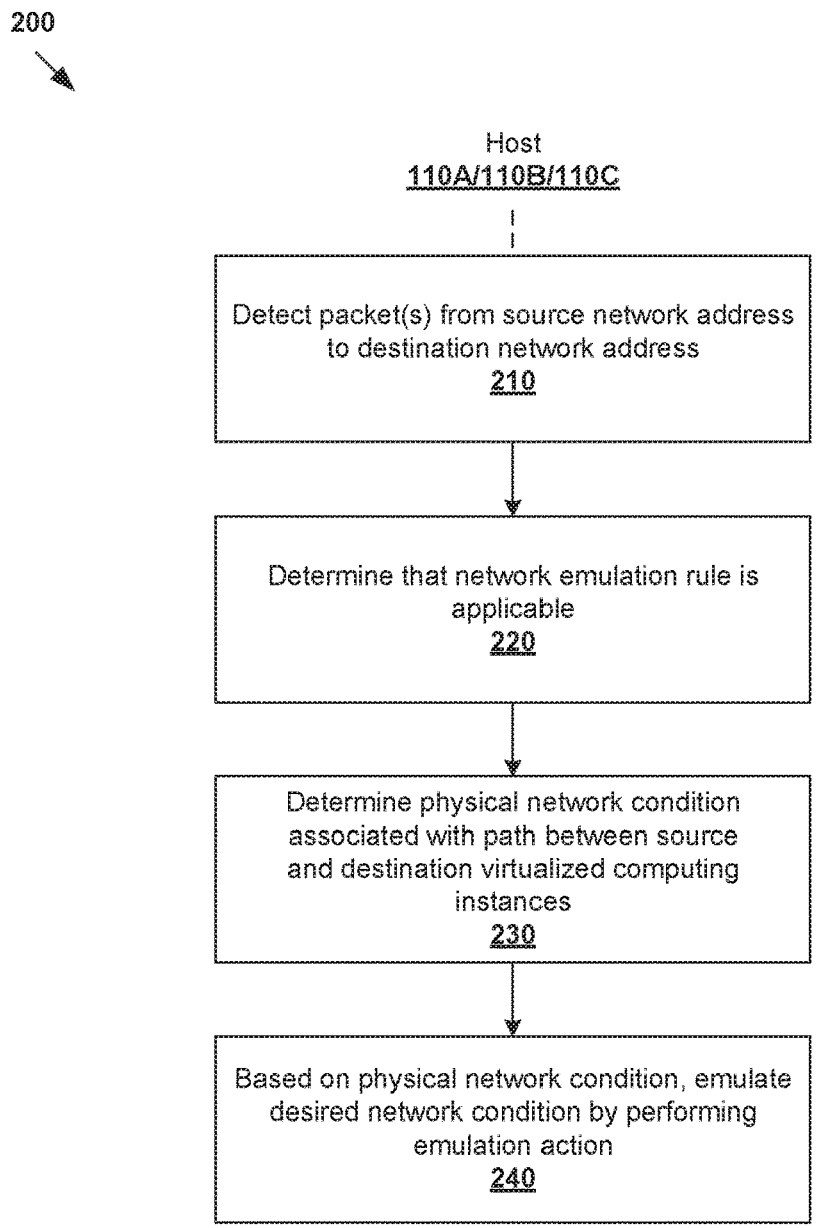
FIG. 2 is a flowchart of an example process for a host to implement distributed network emulation in a virtualized computing environment.

In more detail, FIG. 2 is a flowchart of example process 200 for a host to implement distributed network emulation in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation.

In the following, example process 200 may be implemented by host-C 110C acting as a destination host, such as using destination hypervisor 114C and more particularly distributed network emulator 118C. In practice, it should be understood that network emulation may also be implemented by host-A 110A acting as a source host, such as using distributed network emulator 118A on source hypervisor 114A. VM1 131 will be used as an example "source virtualized computing instance," VM5 135 as an example "destination virtualized computing instance," hypervisor 114A on host-A 110A as a "source hypervisor" and hypervisor 114C on host-C 110C as a "destination hypervisor."

At 210 in FIG. 2, destination host-C 110C detects packet(s) from a source network address=IP1 associated with source VM1 131 to a destination network address=IP5 associated with destination VM5 135 (see arrows in full line at 180 and 182 in FIG. 1). At 220 in FIG. 2, destination host-C 110C determines whether a network emulation rule configured for VM1 131 and VM5 135 is applicable to the packet(s).

As will be discussed further using FIG. 3 and FIG. 4, network emulation rules may be configured using a "network management entity," such as a network virtualization controller 170 (e.g., software defined network (SDN) controller) on a central control plane of virtualized computing environment 100. One example of a network virtualization controller is the NSX controller component of VMware NSX®, available from VMware, Inc. Although one is shown, multiple network virtualization controllers may be deployed, each being responsible for a cluster of hosts (e.g., cluster formed by host-A 110A, host-B 110B and host-C 110C in FIG. 1).

Network virtualization controller 170 may support distributed network emulation under the management of network virtualization manager 160 (e.g., NSX manager) that resides on a management plane of virtualized computing environment 100. Through network virtualization, benefits similar to server virtualization may be derived for networking services in the virtualized computing environment. For example, logical networks may be provisioned, changed, stored, deleted and restored programmatically without having to reconfigure the underlying physical hardware. Network virtualization controller 170 (or network virtualization manager 160) may be implemented using physical machine(s), virtual machine(s), or both.

The network emulation rule may specify a desired network condition to be emulated for packets addressed from the source network address to the destination network address. The desired network condition may include any suitable network characteristics, such as delay, packet loss rate, packet reorder rate, packet duplication rate, bandwidth limitation, disconnection, packet corruption rate, jitter, etc. As will be described further using FIG. 7, FIG. 8A and FIG. 8B, network virtualization controller 170 may perform network emulation rule translation, and update the translation according to network address changes.

At 230 in FIG. 2, in response to determination that the network emulation rule is applicable, destination host-C 110C determines a physical network condition associated with a path between source VM1 131 and destination VM5 135. At 240 in FIG. 2, based on the physical network condition, destination host-C 110C emulates a desired network condition specified by the network emulation rule by performing an emulation action on the packet(s).

As will be described further using FIG. 5 and FIG. 6, the physical network condition may be determined using a monitoring session that is established between source hypervisor 114A on host-A 110A and destination hypervisor 114C on host-C 110C. The monitoring session may be established by destination host-C 110C after obtaining a source session network address configured for source hypervisor 114A. Since the physical network condition changes over time in virtualized computing environment 100, the emulation action may be adjusted to achieve the desired network condition.

In the following, various examples will be explained using FIG. 3 to FIG. 8B. In particular, example network emulation rule configuration and translation will be described using FIG. 3 and FIG. 4, example network emulation rule application using FIG. 5 and FIG. 6, and example translation updates using FIG. 7, FIG. 8A and FIG. 8B.

Network Emulation Rule Configuration and Translation

Figure 3:
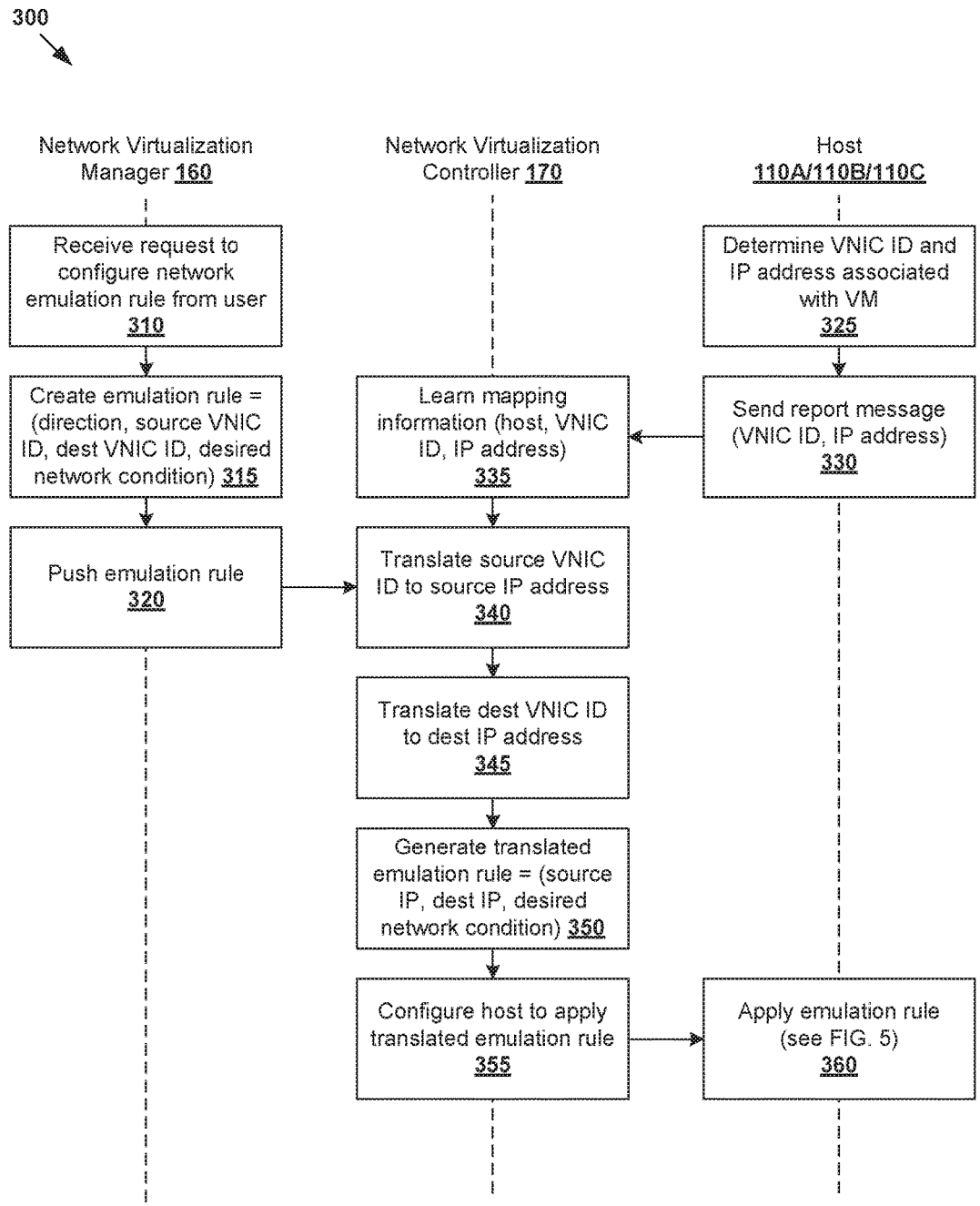
FIG. 3 is a flowchart of an example detailed process for configuring distributed network emulation in a virtualized computing environment.

FIG. 3 is a flowchart of example detailed process 300 for configuring distributed network emulation in virtualized computing environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Example process 300 may be performed by network virtualization manager 160 (e.g., using network emulation configuration module 162), network virtualization controller 170 (e.g., using network emulation control module 172) and host 110A/110B/110C (e.g., using distributed network emulator 118A/118B/118C on hypervisor 114A/114B/114C).

The example in FIG. 3 will be explained using FIG. 4, which is a schematic diagram illustrating example configuration 400 of distributed network emulation according to the example in FIG. 3. The system architecture in FIG. 4 includes network virtualization manager 160 on management plane 402, network virtualization controller 170 on central control plane 404, and host 110A/110C on local control plane 406 (e.g., using hypervisor 114A/114C acting as a local control plane agent). Note that virtual switch 116A/116C may also implement a data plane (not indicated in FIG. 4 for simplicity). To improve scalability and fault tolerance, management plane 402 and central control plane 404 may be cluster-based (i.e., each cluster having multiple nodes serving as network virtualization managers or controllers for redundancy).

At 310 and 315 in FIG. 3, in response to receiving a configuration request from a user (e.g., network administrator), network virtualization manager 160 creates a network emulation rule based on various parameters specified by the user. At 320 in FIG. 3, network virtualization manager 160 on management plane 402 pushes the network emulation rule to network virtualization controller 170 on central control plane 404 for subsequent configuration of a source host and/or destination host.

The configuration may be initiated by the user using any suitable interface provided by network virtualization manager 160, such as a graphical user interface (GUI), command line interface (CLI), etc. For example, the user may specify the desired characteristics of a wide area network (WAN) by interacting with the GUI, or programmatically using a script, etc. In practice, network virtualization manager 160 provides a single interface to configure network emulation rules for various virtual machines 131-136 in virtualized computing environment 100. This should be contrasted against conventional approaches that necessitate configuration on the individual machine or on a dedicated proxy or hardware, which may be time-consuming, error-prone and labor-intensive.

Figure 4:
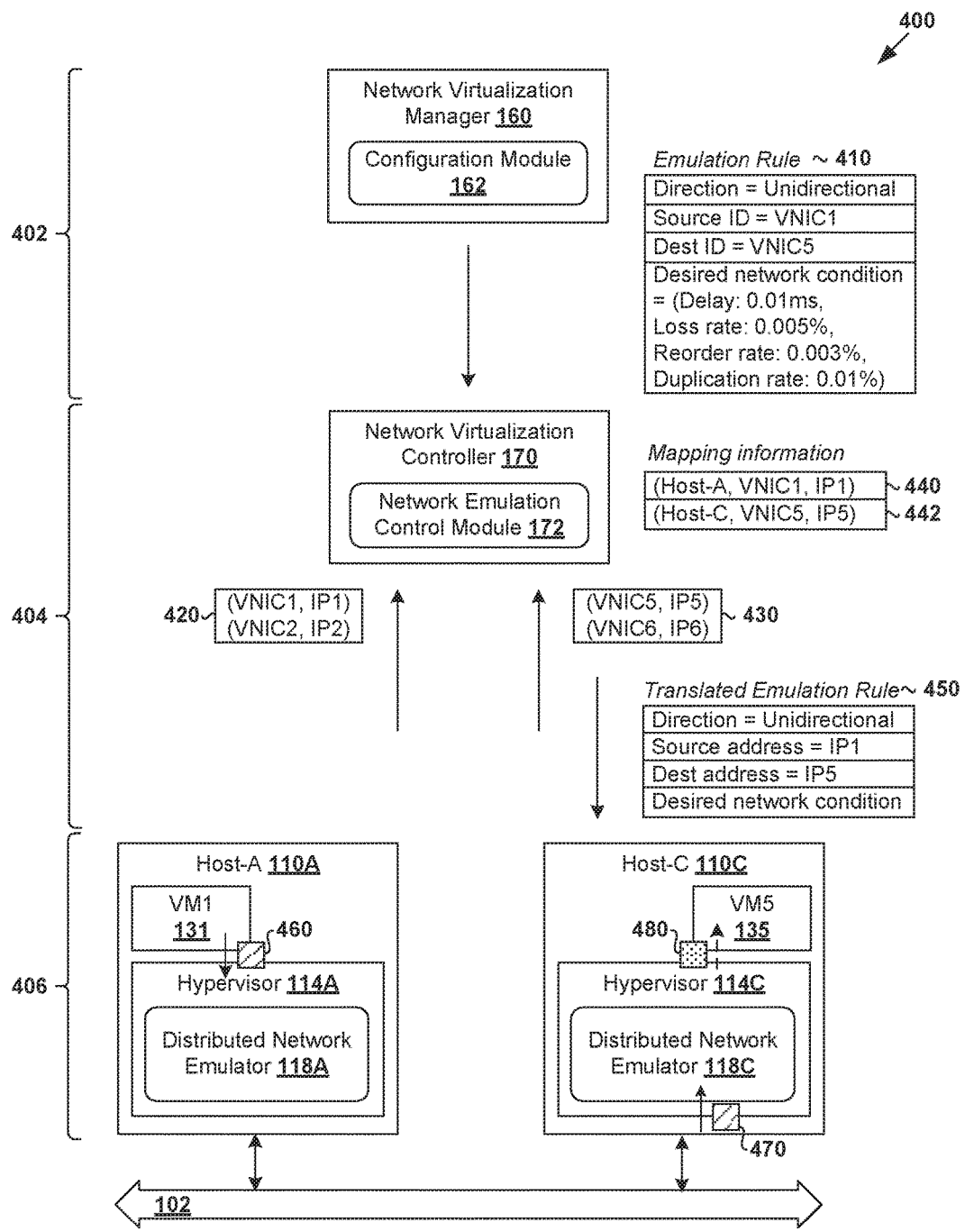
FIG. 4 is a schematic diagram illustrating an example configuration of distributed network emulation according to the example in FIG. 3.

In the example in FIG. 4, example emulation rule 410 is configured with the following parameters: (direction, source ID, destination ID, desired network condition). The direction may be unidirectional (i.e., single direction) or bidirectional. Unidirectional rules are suitable for symmetric networks, such as Ethernet, etc. Bidirectional rules are more suitable for asymmetric networks, such as Asymmetric Digital Subscriber Line (ADSL), General Packet Radio Service (GPRS), Wideband Code Division Multiple Access (WCDMA), Long-Term Evolution (LTE), etc. In the bidirectional case, different rules may be configured for uplink and downlink. For simplicity, direction=unidirectional in the example in FIG. 4.

The source ID and destination ID uniquely identify respective source VM1 131 and destination VM5 135. In the example in FIG. 4, source ID=VNIC1 uniquely identifies VNIC1 (see 151 in FIG. 1) associated with VM1 131, while destination ID=VNIC5 uniquely identifies VNIC5 (see 155 in FIG. 1) associated with VM5 135. Unlike a network address (e.g., IP address) that is susceptible to changes, a VNIC ID is a Universally Unique Identifier (UUID) or a globally unique identifier (GUID) that ensures unambiguous identification of the associated virtual machine. For example, a VNIC ID may be a 128-bit number with a canonical "8-4-4-4-12" representation, such as C852C43E-B416-501A-874C-3CE690A3CC6B.

As such, according to examples of the present disclosure, network emulation rule 410 remains valid even when the IP address of the source or destination is updated. This may occur because of a reassignment by a Dynamic Host Configuration Protocol (DHCP) server, virtual machine migration, etc. Besides VNIC IDs, any other suitable form of unique identification may be used. For example, MAC addresses may be used, such as source ID=MAC1 associated with VM1 131 and destination ID=MAC5 associated with VM5 135. In this case, MAC address conflict among virtual machines 131-136 should be eliminated to ensure their unambiguous identification.

The desired network condition specifies one or more network characteristics to be emulated. In the example in FIG. 4, desired network condition=(delay=0.01 ms; loss rate: 0.005%; reorder rate: 0.003%; duplication rate: 0.01%). The delay specifies the latency or time required for a packet to travel from the source to the destination. The loss rate specifies the proportion of packets that are lost or dropped along the travel path, such as due to congestion, error, etc. The reorder rate specifies the proportion of packets that need to be reordered because they arrive out of sequence at the destination, such as due to unstable routing, etc. The duplication rate specifies the proportion of packets that arrive at the destination as duplicates although a single copy is sent by the source. A specific value or range of values may be specified for each desired characteristic (e.g., delay=0-0.01 ms).

Although not shown in FIG. 4, the desired network condition specified by emulation rule 410 may further any other suitable network characteristics, such as bandwidth limitation, disconnection, packet corruption rate, jitter, etc. The bandwidth limitation specifies the available bandwidth between the source and destination. The packet corruption rate specifies the proportion of packets with errors caused by transmission errors, signal attenuation, noise and sometimes faulty intermediate network devices. The disconnection models the unreliability of a network. In practice, when an end host sends packets in a disconnected network, it receives an Internet Control Message Protocol (ICMP) error message or Transmission Control Protocol (TCP) reset message. Jitter represents a variation in the delay of the received packets.

Network Emulation Rule Translation

According to examples of the present disclosure, network virtualization controller 170 performs network emulation rule translation to translate the IDs in emulation rule 410 to corresponding IP addresses. For example in FIG. 4, destination host-C 110C is generally not aware of source ID=VNIC1 identifying VM1 131 on source host-A 110A. For host-C 110C to apply network emulation rule 410 on packets from VM1 131, network virtualization controller 170 is configured to translate the source ID to a source network address, and the destination ID to a destination network address.

Referring to FIG. 3 again, at 335, network virtualization controller 170 learns mapping information (host, VNIC ID, IP address) from various hosts 110A-110C. For example, at 325 and 330 in FIG. 3, hypervisor 114A/114B/114C may determine the (VNIC ID, IP address) associated with each virtual machine supported by host 110A/110B/110C, and report it to network virtualization controller 170. Since the IP address associated with a particular virtual machine may change over time, the IP address is learned and updated dynamically, such as by monitoring the egress packets from the virtual machine.

Referring to the example in FIG. 4, network virtualization controller 170 learns first mapping information (host-A, VNIC1, IP1) and (host-A, VNIC2, IP2) based on first report message 420 from host-A 110A. Similarly, network virtualization controller 170 learns second mapping information (host-C, VNIC5, IP5) and (host-C, VNIC6, IP6) based on second report message 430 from host-C 110C. Although not shown in FIG. 4 for simplicity, network virtualization controller 170 may also learn (host-B, VNIC3, IP3) and (host-B, VNIC4, IP4) based on a third report message from host-B 110B.

At 340 and 345 in FIG. 3, in response to receiving an instruction to configure emulation rule 410 from network virtualization manager 160, network virtualization controller 170 translates the source ID and destination ID to respective IP addresses. At 350 in FIG. 3, network virtualization controller 170 generates a translated emulation rule that specifies the IP addresses.

In the example in FIG. 4, network virtualization controller 170 generates translated emulation rule 450 by translating (source ID=VNIC1, destination ID=VNIC5) in emulation rule 410 to (source network address=IP1, destination network address=IP5). The translation is based on mapping information (host-A, VNIC1, IP1) and (host-C, VNIC5, IP5); see 440 and 442 in FIG. 4. In practice, the information for mapping the abstract VNIC IDs to real IP addresses may be stored in any storage accessible by network virtualization controller 170. As will be described further using FIG. 7, network virtualization controller 170 may modify and republish the translation whenever the IP addresses are updated.

At 355 and 360 in FIG. 3, network virtualization controller 170 instructs a source host and/or destination host to apply the translated emulation rule. In the example in FIG. 4, based on mapping information (host-A, VNIC1, IP1) and (host-C, VNIC5, IP5), network virtualization controller 170 may identify the associated source host=host-A 110 and destination host=host-C 110C. Since direction=unidirectional, translated emulation rule 450 is pushed to destination host=host-C 110C. In practice, a bidirectional emulation rule may be pushed to both the source host and destination host for application at both hosts.

It should be understood that network virtualization controller 170 only pushes translated emulation rule 450 to the relevant source host and/or destination host. This should be contrasted against conventional approaches that (blindly) distribute emulation rules to all hosts, such as host-B 110B that does not support the source or destination. Such conventional approaches create unnecessary processing burden on host-B 110B because host-B 110B will have to check the (non-applicable) emulation rule for every packet it receives.

During network emulation, in response to receiving packets (see 460 and 470 in FIG. 4) sent by source VM1 131 to destination VM5 135, destination hypervisor 114C (e.g., using distributed network emulator 118C) on destination host-C 110C may apply translated emulation rule 450 to emulate the desired network condition before sending the resulting packets to VM5 135 (see 480 in FIG. 4). A detailed process will be explained below.

Network Emulation Rule Application

Figure 5:
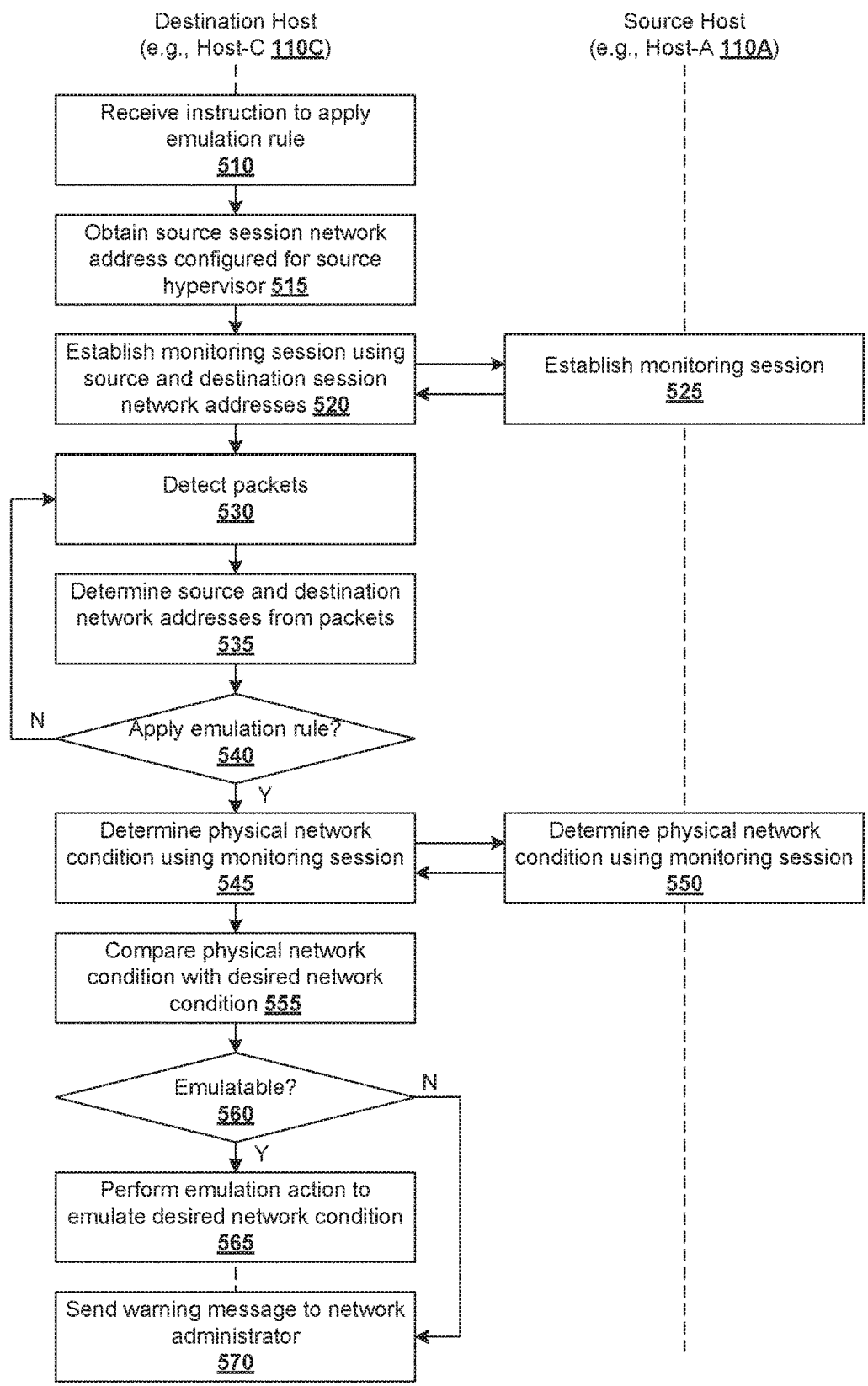
FIG. 5 is a flowchart of an example detailed process for a host to implement distributed network emulation in a virtualized computing environment.

FIG. 5 is a flowchart of example detailed process 500 for a host to implement distributed network emulation in virtualized computing environment 100. Example process 500 may include one or more operations, functions, or actions illustrated by one or more blocks, such as 510 to 570. The various blocks may be combined into fewer blocks, divided into additional blocks, and/or eliminated depending on the desired implementation. In the following, example process 500 will be explained using FIG. 6, which is a schematic diagram illustrating example network emulation rule application 600 according to the example in FIG. 5.

At 510 in FIG. 5, destination host-C 110C receives an instruction from network virtualization controller 170 to implement distributed network emulation. For example in FIG. 6, destination host-C 110C is instructed to apply translated emulation rule 450=(direction=unidirectional, source network address=IP1, destination network address=IP5, desired network condition) in FIG. 4.

For virtualized computing environment 100, underlying physical network 102 is shared by multiple tenants in the data center. As such, the physical network condition between two nodes (e.g., VM1 131 and VM5 135) is often difficult to predict. Conventionally, some software-based emulators merely assume that the communication between two nodes will run on a perfect zero-error, zero-delay network. This assumption may be true in standalone networks (e.g., LAN) with test machines and no other applications that consume network resources. Even in standalone networks, hardware errors or single-point congestion on emulator machines will affect the emulation results.

According to examples of the present disclosure, a monitoring session may be established to monitor the physical network condition between a pair of hosts to improve accuracy of the emulation results. For example in FIG. 6, a monitoring session may be established between source hypervisor 114A at source host-A 110A and destination hypervisor 114C at destination host-C 110C. The monitoring session may be established with the help of network virtualization controller 170 on central control plane 404 without the knowledge of VM1 131 and VM5 135.

At 515, 520 and 525 in FIG. 5, destination host-C 110C obtains a source session network address associated with source host-A 110A in order to establish a monitoring session. To emulate the desired network condition for packets between VM1 131 and VM5 135, probe packets for estimating the physical network condition should travel over the same path as those packets. For example in FIG. 6, VM1 131 may be associated with source network address=1.1.1.5 in a first subnet=1.1.1.0/24 (see 602), while VM5 135 is associated with destination network address=1.1.5.7 in a second subnet=1.1.5.0/24 (see 604).

To establish a monitoring session between the different subnets, network virtualization controller 170 may configure host-A 110A with source session network address=IPA in 1.1.1.0/24 and host-C 110C with destination session network address=IPC in 1.1.5.0/24. Responsive to the instruction to apply translated network emulation rule 450, destination host-C 110C sends a query (see 610 in FIG. 6) to network virtualization controller 170 to obtain the source session network address=IPA of source host-A 110A from (see 620 in FIG. 6). Destination hypervisor 114C then establishes the monitoring session with source hypervisor 114A using the session network addresses, such as by sending a request addressed from IPC to IPA.

In practice, the monitoring session may be established using any suitable network protocol, such as TCP, User Datagram Protocol (UDP), etc. For example, a sliding window may be used to track the arrival of packets, particularly the arrival time and order. Once established, the monitoring session may also be used for a different pair of VMs, such as VM1 131 on host-A 110A and VM6 136 on host-C 110C (provided VM5 135 and VM6 136 are in the same subnet). Otherwise, if VM6 136 is in a different subnet, packets from VM1 131 to VM6 136 might travel on a different path over physical network 102. In this case, a further monitoring session between host-A 110A and host-C 110C is required.

Referring to FIG. 5 again, at 530 and 535, in response to detecting packets, destination host-C 110C determines the source and destination network addresses from the header information of the packets. For example in FIG. 6, VM1 131 sends packets (see 630 in FIG. 6) that are addressed from IP1 to IP5 over physical network 102. At host-C 110C, the packets (see 640 in FIG. 6) are received and processed to identify source network address=IP1 associated with VM1 131 and destination network address=IP5 associated with VM5 135.

At 540 in FIG. 5, based on the source and destination network addresses, destination host-C 110C determines whether a network emulation rule is applicable. If not applicable, host-C 110C continues to monitor for subsequent packets. Otherwise, at 545 in FIG. 5, host-C 110C determines a physical network condition associated with a path between VM1 131 on host-A 110A and VM5 135 on host-C 110C using the monitoring session established at 520 and 525 in FIG. 5.

Figure 6:
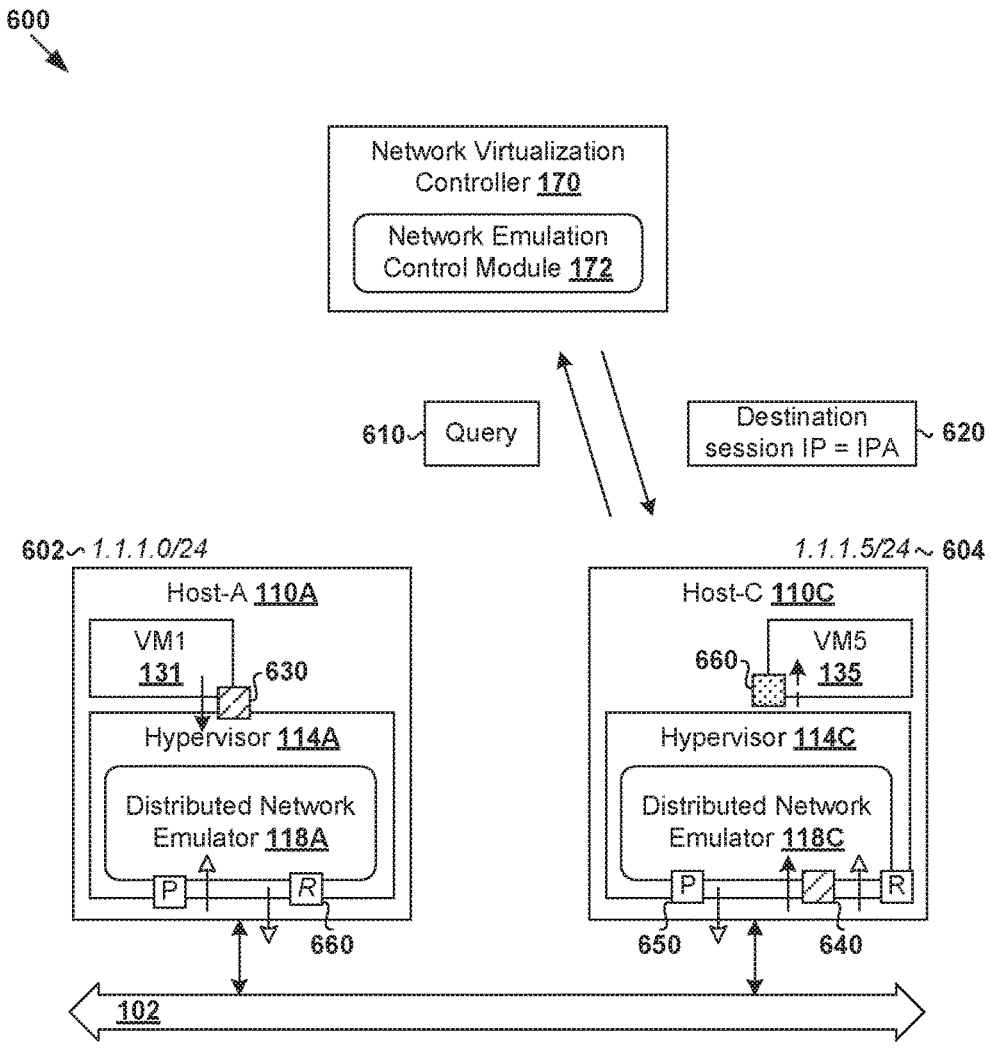
FIG. 6 is a schematic diagram illustrating example network emulation rule application according to the example in FIG. 5.

For example in FIG. 6, destination host-C 110C sends a probe packet (see "P" at 650 in FIG. 6) addressed to source session network address=IPA. In response, source host-A 110A sends with a reply packet (see "R" at 660 in FIG. 6) addressed to destination session network address=IPC. Based on the reply packet, destination host-C 110C may determine the physical network condition. In practice, any suitable techniques (e.g., network tomography) may be used to estimate various characteristics of the physical network condition, such as delay, packet loss rate, packet reorder rate, packet duplication rate, bandwidth limitation, disconnection, packet corruption rate, jitter, etc. Where appropriate, multiple probe and reply packets may be exchanged between host-A 110A and host-C 110C over a period of time.

At 555 and 560 in FIG. 5, destination host-C 110C determines whether the desired network condition is emulatable or achievable based on a comparison between the physical network condition and the desired network condition. If emulatable, at 565 in FIG. 5, an emulation action is performed to emulate the desired network condition. Otherwise, at 570 in FIG. 5, a warning or alert message is sent to the network administrator, such as via network virtualization controller 170 and/or network virtualization manager 160.

For example in FIG. 6, the aim is to emulate desired network condition=(delay=0.01 ms; loss rate: 0.005%; reorder rate: 0.003%; duplication rate: 0.01%) according to translated emulation rule 450 in FIG. 4. If the current physical network delay is 0.005 ms, the emulation action is to add an extra 0.005 ms delay to achieve the desired delay=0.01 ms. If the physical network condition has a loss rate of 0.001%, the emulation action is to discard packets randomly at a rate of 0.004% to achieve the desired packet loss rate=0.005%. Similarly, packets may be randomly selected for duplication to achieve the desired duplication rate=0.01%. Packets may be buffered and reordered to emulate the desired reorder rate=0.003%, such as using a sliding window to track the sequence number of the received packets. Any additional or alternative techniques may be used to emulate the desired network condition.

As such, the emulation action may be dynamically adjusted over time based on the physical network condition. In some cases, the desired network condition may not be achievable. For example, this may occur when the desired delay or loss rate is already exceeded. This might be a temporary problem caused by transient network jitters, or a persistent problem caused by the capacity of underlying physical network 102. If the desired network condition cannot be emulated within a specific period of time (or at all), the network administrator is alerted using the warning message, which flags that the emulation results may not be accurate.

Dynamic Translation Updates

As explained above, network emulation rules are configured using IDs that uniquely identify respective source and destination. The IDs are used instead of IP addresses that are susceptible to changes during the lifetime of the network emulation rules. For example, if a network emulation rule merely specifies the source network address=IP1 and destination network address=IP5, the network emulation rule will become invalid, and bypassed, when IP1 or IP5 is updated.

This necessitates a manual reconfiguration by the network administrator to fix the problem, which is inefficient and undesirable.

Figure 7:
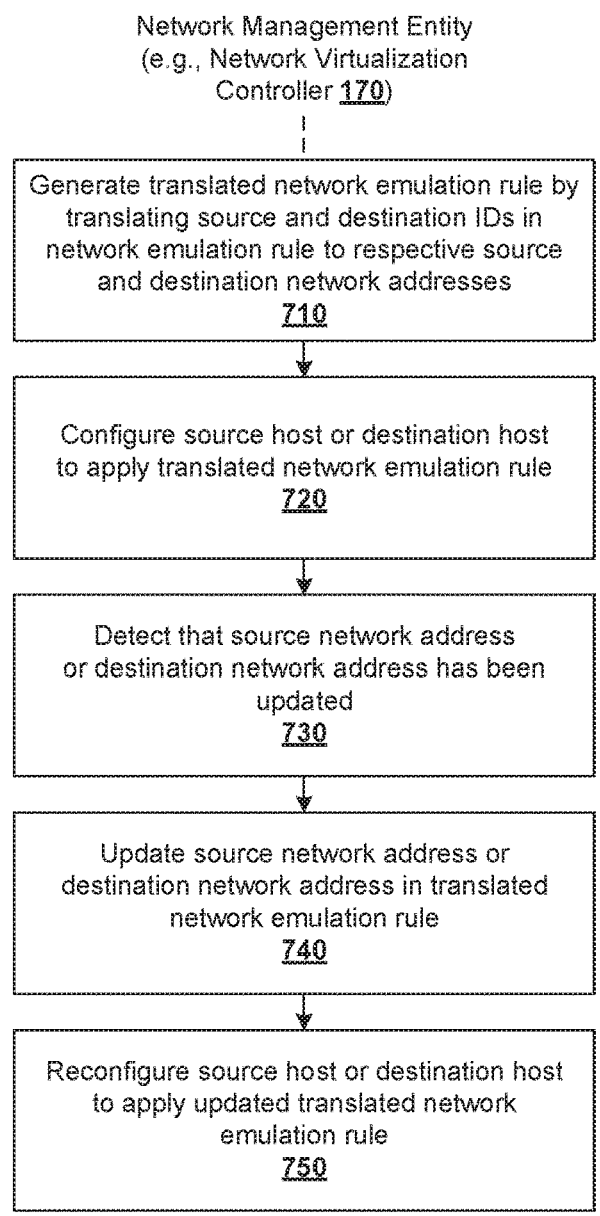
FIG. 7 is a flowchart of an example detailed process for a network management entity to implement distributed network emulation in virtualized computing environment.

According to examples of the present disclosure, network emulation rules may be dynamically retranslated to provide resilience towards IP address changes. In more detail, FIG. 7 is a flowchart of example detailed process 700 for a network management entity to implement distributed network emulation in virtualized computing environment 100. Example process 700 may include one or more operations, functions, or actions illustrated by one or more blocks, such as 710 to 750. The various blocks may be combined into fewer blocks, divided into additional blocks, and/or eliminated depending on the desired implementation. Example process 700 may be performed by network virtualization controller 170 (i.e., an example "network management entity"), such as using network emulation control module 172, etc.

At 710 in FIG. 7, a translated network emulation rule is generated by translating source and destination IDs in a network emulation rule to respective source and destination network addresses. At 720 in FIG. 7, a source host or destination host is configured to apply the translated network emulation rule to emulate a desired network condition for one or more first packets from the source network address to the destination network address. At 730 in FIG. 7, in response to detecting that the source network address or destination network address has been updated, network virtualization controller 170 updates the source network address or destination network address in the translated network emulation rule. At 750 in FIG. 7, the source host or destination host is reconfigured to apply the updated translated network emulation rule to emulate the desired network condition for one or more second packets from the updated source network address, or to the updated destination address.

Blocks 710 and 720 in FIG. 7 are similar to blocks 340 to 355 in FIG. 3. Using the example in FIG. 4 again, emulation rule 410 specifies source ID=VNIC1 associated with VM1 131 and destination ID=VNIC5 associated with VM5 135. After translation, translated emulation rule 450 specifies the source network address=IP1 and destination network address=IP5. The translation is performed based on mapping information (host-A, VNIC1, IP1) and (host-C, VNIC5, IP5) learned by network virtualization controller 170 from host-A 110A and host-B 110B, respectively. Destination host-C 110C is then configured to apply translated emulation rule 450 to emulate a desired network condition for packets from IP1 to IP5 ("first packets"). When IP1 or IP5 changes, translated emulation rule 450 is updated such that it remains valid. Some examples are explained below using FIG. 8A and FIG. 8B.

Figure 8A:
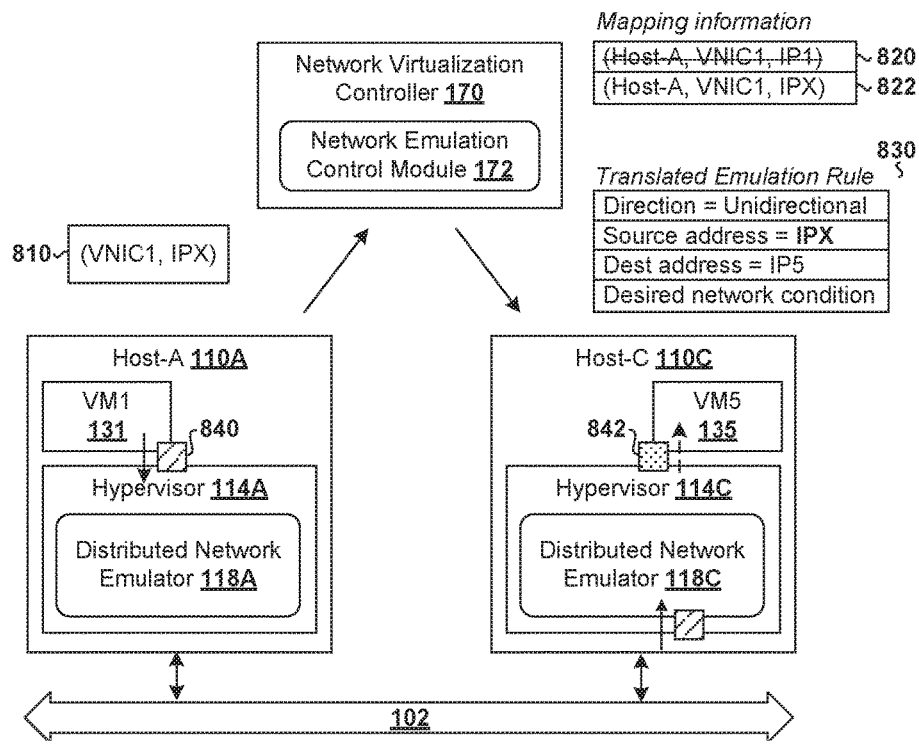
FIG. 8A is a schematic diagram illustrating a first example of updating a translated network emulation rule according to the example in FIG. 7.

FIG. 8A is a schematic diagram illustrating a first example of updating a translated network emulation rule according to the example in FIG. 7. In this example, network virtualization controller 170 detects that source network address associated with VM1 131 has been updated from IP1 to IPX. In this example, the update is caused by a dynamic address reassignment by a DHCP server (not shown for simplicity), which leases the source network address to VM1 131 for a predefined period of time. The lease is usually renewed periodically for VM1 131 to continue using the source network address. However, in some cases, the renewal is not made and VM1 131 reassigned with a new network address.

In the example in FIG. 8A, network virtualization controller 170 may detect the update based on a report message (see 810 in FIG. 8A) from host-A 110A that associates source ID=VNIC1 with updated source network address=IPX. In this case, network virtualization controller 170 updates first mapping information (host-A, VNIC1, IP1) to (host-A, VNIC1, IPX); see 820 and 822 in FIG. 8A. Network virtualization controller 170 generates an updated translated emulation rule (see 830 in FIG. 8A) that specifies updated source network address=IPX. Host-C 110C is then reconfigured to apply updated translated emulation rule 830 to emulate a desired network condition for packets from IPX to IP5 ("second packets"); see 840 and 842 in FIG. 8A.

Figure 8B:
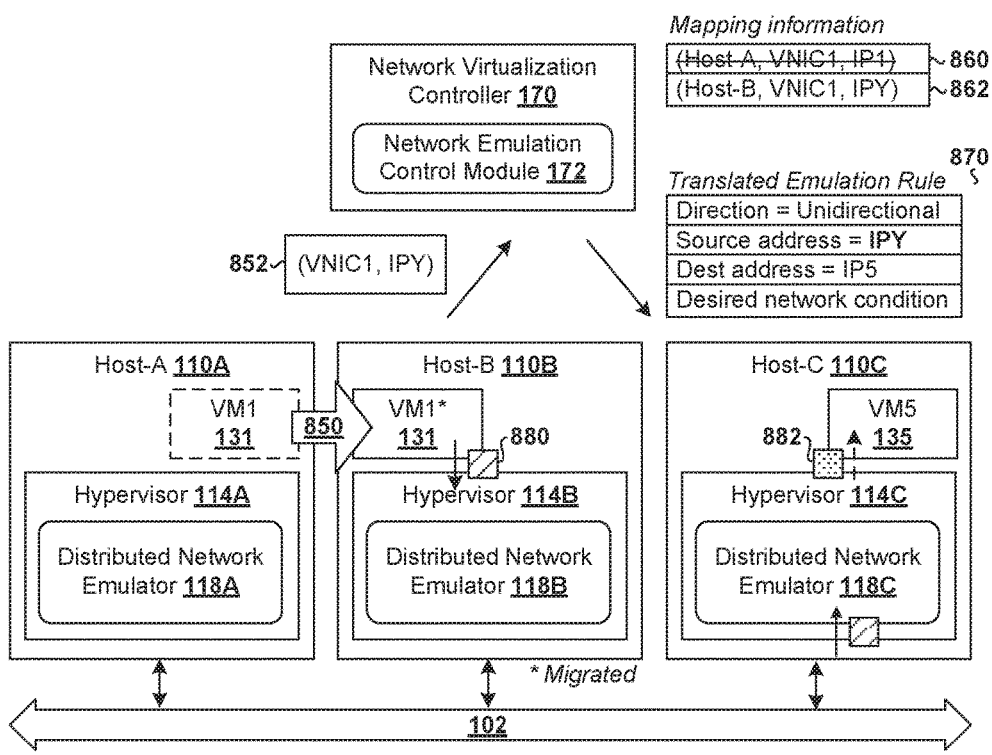
FIG. 8B is a schematic diagram illustrating a second example of updating a translated network emulation rule according to the example in FIG. 7.

FIG. 8B is a schematic diagram illustrating a second example of updating a translated network emulation rule according to the example in FIG. 7. In this example, network virtualization controller 170 detects that source network address associated with VM1 131 has been updated from IP1 to IPY. In this example, the update is caused by the migration of VM1 131 from host-A 110A to host-B 110B (see 850 in FIG. 8B). In practice, not all migrations necessitate a network address change, but in some cases the migrated virtual machine is assigned with a new network address. Although not shown in FIG. 8B for simplicity, VMM1 141 and VNIC1 151 are also migrated along with VM1 131.

Network virtualization controller 170 may detect the update based on a report message (see 852 in FIG. 8B) from host-B 110B that associates source ID=VNIC1 with updated network address=IPY. In this case, mapping information (host-A, VNIC1, IP1) is updated to (host-B, VNIC1, IPX); see 860 and 862 in FIG. 8B. Network virtualization controller 170 also generates an updated translated emulation rule (see 870 in FIG. 8B) that specifies updated source network address=IPY. Host-C 110C is then configured to apply updated translated emulation rule 870 to emulate a desired network condition for packets addressed from IPY to IP5 ("second packets"); see 880 and 882 in FIG. 8B. By performing the dynamic translation and retranslation, ID-based network emulation rules are more resilient towards network address changes.

In the example in FIG. 8B, since the source host has also changed, network virtualization controller 170 may also send destination host-C 110C an updated session network address=IPB associated with new source host-B 110B. This allows hypervisor 114C on host-C 110C to establish a monitoring session with hypervisor 114B on host-B 110B (see 520 and 525 in FIG. 5) in order to determine the physical network condition associated with a path between VM1 131 and VM5 135. Similarly, IPB should be in the same subnet as updated source network address=IPY to ensure that the probe and reply packets sent during the monitoring session travel the same path as the packets between VM1 131 and VM5 135.

Although FIG. 8A and FIG. 8B illustrate an update to the source network address, the destination network address=IP5 may also change. In this case, network virtualization controller 170 may update the translated emulation rule to specify the updated destination network address, say IPZ associated with VM5 135. Similarly, network virtualization controller 170 may detect the update based on a report message from host-C 110C (e.g., due to a reassignment by DHCP server), or from a new host-D to which VM5 135 is migrated. Based on the report message, network virtualization controller 170 may learn updated mapping information that associates VNIC5 with IPZ. When a migration to host-D is detected, a new monitoring session may be established between hypervisor 114A on host-A 110A to the hypervisor of host-D.

In practice, multiple network emulation rules may be configured and implemented for different pairs of virtual machines. For example in FIG. 1, distributed network emulation may be implemented by destination host-B 110B to emulate a desired network condition for packets from VM2 132 to VM3 133. As such, host-A 110A, host-B 110B and host-C 110C may be configured to apply network emulation rules on different traffic flows in a distributed manner without the need of a centralized network proxy or dedicated hardware emulators.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8B. For example, a computer system capable of acting as network virtualization manager 160, network virtualization controller 170 or host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to implement distributed network emulation in a virtualized computing environment that includes the network management entity, a source host supporting a source virtualized computing instance, and a destination host supporting a destination virtualized computing instance, wherein the method comprises:

generating a translated network emulation rule by translating a source identifier and a destination identifier in a network emulation rule to respective source network address and destination network address, wherein the source identifier uniquely identifies the source virtualized computing instance and the destination identifier uniquely identifies the destination virtualized computing instance;

configuring the source host or destination host to apply the translated network emulation rule to emulate a desired network condition for one or more first packets from the source network address to the destination network address;

in response to detecting that the source network address or destination network address has been updated,
updating the source network address or destination network address in the translated network emulation rule; and
reconfiguring the source host or destination host to apply the updated translated network emulation rule to emulate the desired network condition for one or more second packets from the updated source network address, or to the updated destination network address.

2. The method of claim 1, wherein generating the translated network emulation rule comprises:

learning, from the source host, first mapping information that associates the source identifier with the source network address; and learning, from the destination host, second mapping information that associates the destination identifier with the destination network address.

3. The method of claim 2, wherein detecting that the source network address has been updated comprises:

based on a report message from the source host or a new source host to which the source virtualized computing instance is migrated, learning updated first mapping information that associates the source identifier with the updated source network address.

4. The method of claim 2, wherein detecting that the destination network address has been updated comprises:

based on a report message from the destination host or a new destination host to which the destination virtualized computing instance is migrated, learning updated second mapping information that associates the destination identifier with the updated destination network address.

5. The method of claim 3, wherein reconfiguring the destination host to apply the translated network emulation rule comprises:

sending, to the destination host, a source session network address associated with the new source host for the destination host to establish a monitoring session to determine a physical network condition associated with a path between the destination host and the new source host and to emulate the desired network condition based on the physical network condition.

6. The method of claim 1, wherein generating the translated network emulation rule comprises:

translating the source identifier, being a source virtual network interface controller (VNIC) identifier or a source Media Access Control (MAC) address associated with the source virtualized computing instance, to the source network address; and translating the destination identifier, being a destination VNIC identifier or a destination MAC address associated with the destination virtualized computing instance, to the destination network address.

7. The method of claim 1, wherein the network management entity is a network virtualization controller on a central control plane of the virtualized computing environment, and generating the translated network emulation rule comprises:

generating the translated network emulation rule responsive to an instruction from a network virtualization manager on a management plane of the virtualized computing environment to configure the source host or destination host to apply the network emulation rule.

8. A non-transitory computer-readable storage medium that includes a set of instructions which, in response to execution by a processor of a network management entity, cause the processor to perform a method of distributed network emulation in a virtualized computing environment, wherein the method comprises:

generating a translated network emulation rule by translating a source identifier and a destination identifier in a network emulation rule to respective source network address and destination network address, wherein the source identifier uniquely identifies a source virtualized computing instance supported by a source host and the destination identifier uniquely identifies a destination virtualized computing instance supported by a destination host;

configuring the source host or destination host to apply the translated network emulation rule to emulate a desired network condition for one or more first packets from the source network address to the destination network address;

in response to detecting that the source network address or destination network address has been updated, updating the source network address or destination network address in the translated network emulation rule; and reconfiguring the source host or destination host to apply the updated translated network emulation rule to emulate the desired network condition for one or more second packets from the updated source network address, or to the updated destination network address.

9. The non-transitory computer-readable storage medium of claim 8, wherein generating the translated network emulation rule comprises:

learning, from the source host, first mapping information that associates the source identifier with the source network address; and learning, from the destination host, second mapping information that associates the destination identifier with the destination network address.

10. The non-transitory computer-readable storage medium of claim 9, wherein detecting that the source network address has been updated comprises:

based on a report message from the source host or a new source host to which the source virtualized computing instance is migrated, learning updated first mapping information that associates the source identifier with the updated source network address.

11. The non-transitory computer-readable storage medium of claim 9, wherein detecting that the destination network address has been updated comprises:

based on a report message from the destination host or a new destination host to which the destination virtualized computing instance is migrated, learning updated second mapping information that associates the destination identifier with the updated destination network address.

12. The non-transitory computer-readable storage medium of claim 10, wherein reconfiguring the destination host to apply the translated network emulation rule comprises:

sending, to the destination host, a source session network address associated with the new source host for the destination host to establish a monitoring session to determine a physical network condition associated with a path between the destination host and the new source host and to emulate the desired network condition based on the physical network condition.

13. The non-transitory computer-readable storage medium of claim 8, wherein generating the translated network emulation rule comprises:

translating the source identifier, being a source virtual network interface controller (VNIC) identifier or a source Media Access Control (MAC) address associated with the source virtualized computing instance, to the source network address; and translating the destination identifier, being a destination VNIC identifier or a destination MAC address associated with the destination virtualized computing instance, to the destination network address.

14. The non-transitory computer-readable storage medium of claim 8, wherein the network management entity is a network virtualization controller on a central control plane of the virtualized computing environment, and generating the translated network emulation rule comprises:

generating the translated network emulation rule responsive to an instruction from a network virtualization manager on a management plane of the virtualized computing environment to configure the source host or destination host to apply the network emulation rule.

15. A network management entity configured to implement distributed network emulation in a virtualized computing environment, comprising:

a processor; and a non-transitory computer-readable medium having stored thereon instructions that, when executed by the processor, cause the processor to:

generate a translated network emulation rule by translating a source identifier and a destination identifier in a network emulation rule to respective source network address and destination network address, wherein the source identifier uniquely identifies a source virtualized computing instance supported by a source host and the destination identifier uniquely identifies a destination virtualized computing instance supported by a destination host;

configure the source host or destination host to apply the translated network emulation rule to emulate a desired network condition for one or more first packets from the source network address to the destination network address;

in response to detecting that the source network address or destination network address has been updated, update the source network address or destination network address in the translated network emulation rule; and reconfigure the source host or destination host to apply the updated translated network emulation rule to emulate the desired network condition for one or more second packets from the updated source network address, or to the updated destination network address.

16. The network management entity of claim 15, wherein instructions for generating the translated network emulation rule cause the processor to:

learn, from the source host, first mapping information that associates the source identifier with the source network address; and learn, from the destination host, second mapping information that associates the destination identifier with the destination network address.

17. The network management entity of claim 16, wherein instructions for detecting that the source network address has been updated cause the processor to:

based on a report message from the source host or a new source host to which the source virtualized computing instance is migrated, learn updated first mapping information that associates the source identifier with the updated source network address.

18. The network management entity of claim 16, wherein instructions for detecting that the destination network address has been updated cause the processor to:

based on a report message from the destination host or a new destination host to which the destination virtualized computing instance is migrated, learn updated second mapping information that associates the destination identifier with the updated destination network address.

19. The network management entity of claim 17, wherein instructions for reconfiguring the destination host to apply the translated network emulation rule cause the processor to:

send, to the destination host, a source session network address associated with the new source host for the destination host to establish a monitoring session to determine a physical network condition associated with a path between the destination host and the new source host and to emulate the desired network condition based on the physical network condition.

20. The network management entity of claim 15, wherein instructions for generating the translated network emulation rule cause the processor to:

translate the source identifier, being a source virtual network interface controller (VNIC) identifier or a source Media Access Control (MAC) address associated with the source virtualized computing instance, to the source network address; and translate the destination identifier, being a destination VNIC identifier or a destination MAC address associated with the destination virtualized computing instance, to the destination network address.

21. The network management entity of claim 15, wherein the network management entity is a network virtualization controller on a central control plane of the virtualized computing environment, and instructions for generating the translated network emulation rule cause the processor to:

generate the translated network emulation rule responsive to an instruction from a network virtualization manager on a management plane of the virtualized computing environment to configure the source host or destination host to apply the network emulation rule.

* * * * *